Paul H. Granger,
INVENTOR.

BY
ATTORNEY.

Aug. 4, 1942.   P. H. GRANGER   2,291,892
FLUID RETAINING CUP
Filed Feb. 5, 1941   2 Sheets-Sheet 2

Paul H. Granger,
INVENTOR.

BY Alfred W. Knight

ATTORNEY.

Patented Aug. 4, 1942

2,291,892

UNITED STATES PATENT OFFICE 2,291,892

FLUID RETAINING CUP

Paul H. Granger, Los Angeles, Calif.

Application February 5, 1941, Serial No. 377,503

9 Claims. (Cl. 309—33)

The present invention relates generally to packers, swabs, and the like for use in oil wells, and more especially to the construction of fluid-retaining cups which are used in these devices to obtain a seal with the casing in order to hold a body of fluid under high pressure.

These cups generally comprise an annular body of rubber or similar material provided with suitable reinforcement to withstand the high fluid pressures which are applied internally to the cup. The reinforcing means has, in some types, been a plurality of wires embedded within the body and extending longitudinally of it, and in other types the reinforcing comprises several layers of canvas embedded in the body material. In all former types of cups, the reinforcement is thoroughly bonded to the body material. As a consequence, the body is not only reinforced, but the adhesion of the body material to the reinforcement decreases the flexibility of the body itself far below the flexibility which would be obtained from the same material without reinforcement.

Reinforcement of this character enables the cups to withstand high pressures, but at the same time it renders the cups relatively hard and stiff, so that there is very little expansibility or flexibility in the reinforced body. As a consequence of this characteristic, it is necessary that the cup fit closely in the casing down which it is run, since the cup is not sufficiently expansible to be adapted to use in casings over any appreciable size range. For example, there is considerable difference in the internal diameter of well casings of the same nominal size but of different weights. This difference is sufficient that a packer cup adapted for use in a heavy weight or thick walled casing has so little variation in size that it is not adapted to use in a light weight casing having a relatively thin wall. Likewise, the conventional cup of larger diameter adapted to use in the light weight casing cannot be sufficiently compressed to operate satisfactorily in a thick walled casing of lesser internal diameter.

Probably the most important result of this lack of flexibility in the body when reinforced as described, is the inability of the body to follow irregularities in the internal surface of the casing, and consequent inability to provide an adequate fluid-retaining seal. The interior surface of casings frequently becomes irregularly worn or cut by the passage of steel cables and tools up and down the casing; and unless a packer cup is sufficiently flexible to conform to the interior surface of the casing, the seal between the packer and the casing is not perfectly fluid-tight.

Thus it becomes a general object of my invention to construct a reinforced fluid retaining cup which is sufficiently strong to resist the applied internal fluid pressures, and yet which is considerably more elastic and flexible than are cups of conventional construction.

Another object of my invention is to provide a reinforced cup which expands to conform to irregularities in the internal surface of the casing and forms a fluid-tight seal.

It is also an object of my invention to provide reinforcement for a fluid-retaining cup which acts to reinforce the body material of the cup after the body material has been deformed beyond a predetermined initial amount; and during that predetermined initial deformation the body material has characteristics of flexibility and the like, substantially as though the body were not provided with reinforcement.

The above objects are attained according to my invention by providing for the cup an annular body of flexible material which is preferably also elastic. The body has an annular cavity in it, and in the cavity is placed the reinforcing means. The reinforcement is circumferentially extensible, and is also preferably elastic, to permit and aid expansion of the body to fit tightly against the casing, even in out-of-round places. The reinforcement is not attached to the body, except as may be required to hold it in place in the cavity, but is free to move with respect to the cavity side walls, thus not stiffening the body but acting to reinforce it after the initial expansion. Heavy fabric, such as canvas, or metal in the shape of rings or overlapping segments are examples of suitable reinforcing.

How the above, as well as other objects and advantages of my invention not specifically mentioned, are attained will be more readily understood by reference to the following description and the annexed drawings, in which.

Figure 1:
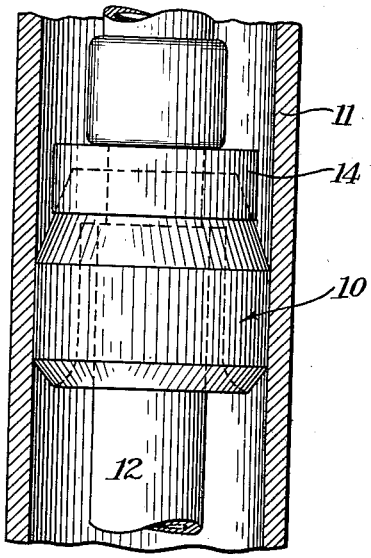
Fig. 1 is an elevation of a cup in place within a well casing.

Fig. 1 shows a packer cup, generally indicated at 10, in place within casing 11. The cup is carried on the drill stem or tubing 12, and at its upper or closed end is a cup-shaped follower 14 which is likewise mounted on the drill stem and affords external support to the cup for a portion of its length.

Figure 2:
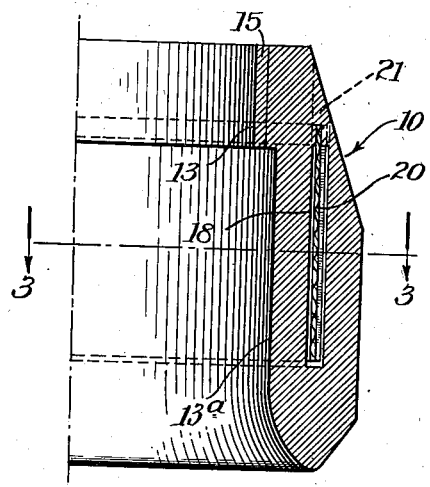
Fig. 2 is an enlarged vertical half-section of a cup constructed according to my invention.

As may be seen from the sectional view in Fig. 2, cup 10 is annular in shape, the internal bore being divided into two sections 13 and 13a, one larger than the other. The smaller section 13 is lined with a metallic bushing 15 which helps secure the cup to the drill stem. The diameter of the larger bore 13a is greater than the diameter of pipe 12, in order that fluid to be retained within the casing under pressure can reach the inner side of the cup body and exert an outward pressure.

In showing and describing a cup constructed according to my invention, I have shown the closed end of the cup as being placed upwardly; but it will be realized that my invention is not limited by this showing since the closed end of the cup may also be placed down to form a seal at the lower end of the fluid body. Also, the invention is not limited to the particular shape of cup body disclosed herein, this shape being merely typical of those to which my invention may be applied.

The annular body of cup 10 is preferably made of rubber, a rubber compound, or any other suitable material having similar characteristics of flexibility and elasticity.

Figure 3:
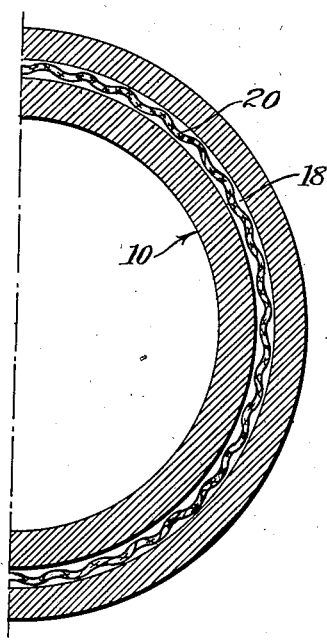
Fig. 3 is a horizontal half-section on line 3—3 of Fig. 2.

As may be seen from Figs. 2 and 3, the body is formed with an internal annular cavity 18 which extends axially of the cup for the major portion of its length. The cavity is preferably cylindrical, as shown in Fig. 2; but this is done chiefly for ease in manufacture. If desired, the side walls of the cavity can be inclined, making the cavity more or less conical.

The vertical side walls of the cavity are preferably parallel. It is contemplated that in manufacture the cavity 18 will initially be open at the upper end of the packer, and that this open upper end will be closed after the reinforcing material is inserted. Alternatively, the packer can be made with the reinforcing in place.

In the form of the invention shown in Figs. 2 and 3, the means reinforcing the cup body comprises a layer of canvas 20 placed within cavity 18. Canvas layer 20 is embedded at its upper end in a ring of rubber indicated at 21 by the vertical dotted lines, this ring being of the same thickness as cavity 18. The layer of reinforcing canvas and the ring are inserted as a unit into the body cavity 18, the ring completely filling the upper end of the cavity. Ring 21 is made of the same material as the body and, after the reinforcing is in place, is vulcanized to the body so as to become an integral part of the body, and the canvas layer may be considered to be embedded at its upper end in the body of the cup.

It will be noticed that the layer of canvas 20 is preferably at least slightly smaller in thickness than the radial dimension of the body cavity 18, and thus the reinforcing material is entirely free from any attachment to the side walls of the cavity and is free to slide over the side walls. The canvas is likewise free from attachment to the body at its lower end, although it may be desired under some circumstances to attach stay wires or stiffeners to the canvas at intervals, which wires may be embedded at the ends in the body.

Layer 20 of canvas is placed in the body cavity in a manner to present a corrugated or wrinkled appearance, as shown in Fig. 3, since the circumferential length of the canvas layer itself is somewhat greater than the circumferential length of the body cavity in which the canvas is placed. By adopting this arrangement, the canvas layer is circumferentially extensible as the body of the packer extends in diameter under the influence of internal fluid pressure. After the body has extended a predetermined amount, canvas 20 becomes tight and resists any further extension or deformation of the packer body, and the canvas serves to reinforce the body against internal radial loads. During the initial deformation of the body, the canvas is free to move with respect to the walls of body cavity 18.

Figure 4:
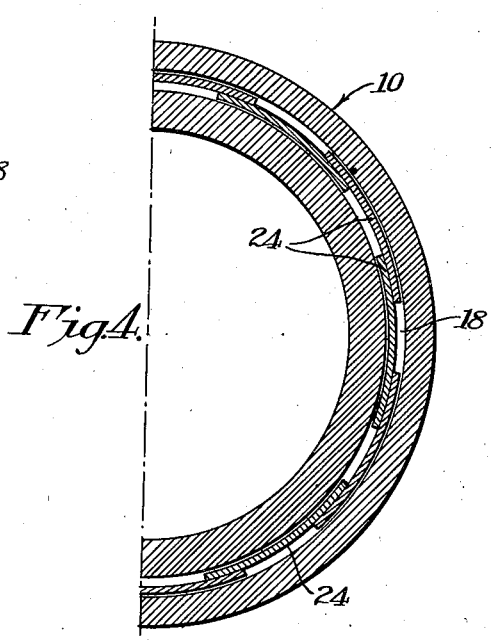
Fig. 4 is a view similar to Fig. 3, showing a variational form of reinforcing means.

Fig. 4 discloses a variational form of reinforcing means which may be employed to replace canvas 20. In Fig. 4, the reinforcing comprises a plurality of arcuately shaped metal strips 24 which are embedded at their upper ends in the body material, as by first forming a portion of the body in the shape of ring 21 and then causing the ring to become an integral portion of the body itself. Metal strips 24 are placed in overlapping relation with each other, as shown in Fig. 4, there being preferably two rows of the strips with successive members in each row spaced from one another. The individual strips 24 are free to slide with respect to each other and with respect to the walls of body cavity 18, and in this way the several metal strips form a circumferentially extensible reinforcement which adapts itself to expansion or deformation of the packer body, but at the same time supports the packer against internal radial loads. Each strip 24 is preferably somewhat less in thickness than half the radial thickness of cavity 18, in order that the strips where they overlap do not bind on the walls of the cavity.

Figures 5, 6:
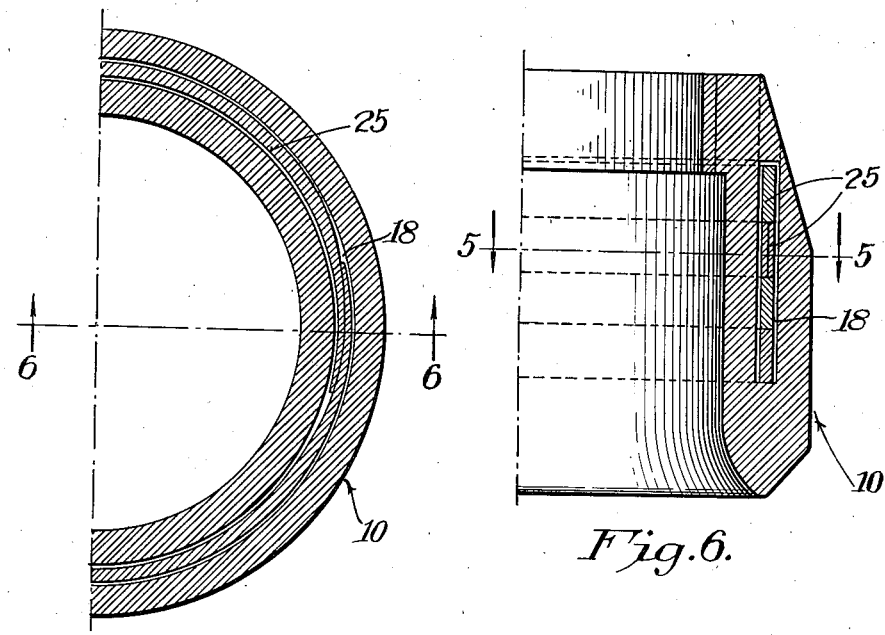
Fig. 5 is a view similar to Fig. 3 on line 5—5 of Fig. 6, showing another variational form of reinforcing means.
Fig. 6 is a vertical half section, similar to Fig. 2, showing the reinforcing of Fig. 5.

Figs. 5 and 6 illustrate another variational form of reinforcing means placed in cavity 18 of the packer 10. In this form the reinforcement consists of a plurality of split rings 25 which may be made of metal, molded plastic, or any other suitable elastic material having the requisite strength. As shown in Fig. 5, rings 25 are not continuous but are split in order that they may enlarge circumferentially; and it is preferred that the ends of these rings be tapered with considerable overlap as shown in order that the ends of the rings do not become separated even at the maximum expansion. This also assures greater strength at the joint. The rings are not bonded to the body material, leaving each ring free to move with respect to the side walls of the cavity during expansion of the ring. Although a single ring of the full length of cavity 18 can be employed, it is preferred to use a plurality of rings, as shown in Fig. 6, the rings being stacked one on another. The joints of the several rings are staggered around the perimeter of cavity 18 in order to secure the greatest strength from the reinforcing means.

The split ring type of reinforcing means has a particular advantage in that the rings may be made large enough to place the cup body under an initial outward force tending to expand the body. This inherent extensibility of the rings provides a highly elastic cup, as a whole. The force of the rings may be added to the natural elasticity of the body to cause the body to press more tightly against the casing than is possible with conventional cups; or it may permit the use of body materials that are not suited to conventional construction because they are insufficiently elastic. In general, the elasticity of the cup as a whole, may be supplied by either the material of the body, the reinforcing means, or by both.

Attachment of any reinforcing means to the body is reduced to the minimum necessary to support the reinforcing elements in the proper position within the body cavity, and otherwise the reinforcing is free to move, to at least a limited extent, with respect to the side walls of the cavity. As a consequence of this construction, the physical characteristics of the cup, such as deformability, elasticity, and the like, are at the time of initial stressing substantially those characteristics of the body material alone without the effect of the reinforcing. However, after the body has been deformed to a limited extent the body material presses against the reinforcing which resists the outward thrust of the radial loads applied by the fluid body under pressure contained within the large diameter bore of the packer.

As may be seen from Fig. 1, the cylindrical portion of the outside surface of the cup is in contact with and supported by the inside surface of casing 11, while the upper portion of the conical outside surface is in contact with and supported by follower 14. The weakest portion of the cup is the interval between these two externally supported portions, that is, the portion of the outside surface immediately above the cylindrical surface. For this reason, the reinforcing means is so located within cavity 18 as to bridge the gap between the externally supported portions of the body and provide reinforcing where the need is greatest. For the same reason, the reinforcing means does not need to extend to the lower tip, thus leaving this portion of the packer cup as flexible as possible to adapt itself to any surface irregularities in the casing and form a tight seal.

It will be noted that in each form of my invention the inner surface of the annular wall of the flexible cup body is subject to outward fluid pressure and that the outer surface of said wall is adapted to engage the interior of a casing or the like. Said wall is provided with an annular cavity which is located outward of said inner surface. The reinforcing means is located in this cavity and is adapted to resist radial outward loads. In other words, the annular wall of the flexible cup body has a wall portion disposed inward of the cavity and the reinforcing means is disposed outward of said wall portion and is adapted to engage said wall portion to resist radial outward loads.

It has been found that this type of construction affords the maximum of flexibility and adjustability in the cup, thus assuring a perfect seal under a wide range of conditions, while at the same time providing necessary reinforcement where needed to resist radial loads. It will also be evident that the general principles of my invention may be applied to cups of other sizes and shapes than the one illustrated here, and that the invention is not limited to any particular type of or material for reinforcing means nor use for the cup. Cups made according to my invention may be used not only in packers but also in swabs and pumps. In the latter case, the pump barrel becomes the casing with which the cup cooperates to provide a fluid tight seal.

Having described my invention with reference to various embodiments thereof, it will be understood that changes in the shape and arrangement of parts may be made without departing from the spirit and scope of my invention; and consequently, it is to be understood that the foregoing description is to be considered as illustrative of, rather than limitative upon, the invention as defined by the appended claims.

I claim:

1. A fluid retaining cup for use in a casing or the like, comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means being free to move with respect to the side walls of the cavity during circumferential extension.

2. A fluid retaining cup for use in a casing or the like, comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means being smaller in radial thickness than the radial dimension of the cavity.

3. A fluid retaining cup for use in a casing or the like, comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means being attached at one end only to the body and free to move with respect to the side walls of the cavity during circumferential extension.

4. A fluid retaining cup for use in a casing or the like, comprising a flexible cup body having an annular wall whose inner surface is subject to outward fluid pressure and whose outer surface is adapted to engage the interior of a casing or the like, said wall having an annular cavity located outward of said inner surface and extending axially of the body for the major portion of its length, and circumferentially extensible reinforcing means located in the cavity and extending substantially the full axial length of the cavity to resist radial outward loads, the reinforcing means being free to move with respect to the side walls of the cavity during circumferential extension.

5. A fluid retaining cup for use in a casing or the like, comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means comprising a layer of canvas embedded at one end in the body and free to move with respect to the side walls of the cavity during circumferential extension.

6. A fluid retaining cup for use in a casing or the like comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means comprising a plurality of overlapping arcuate metal strips embedded at one end in the body and free to move with respect to each other and the side walls of the cavity during circumferential extension.

7. A fluid retaining cup for use in a casing or the like, comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means comprising a plurality of individual split rings, the rings being resilient with overlapping tapered ends permitting circumferential extension of each ring.

8. A fluid retaining cup for use with a casing or the like, comprising a flexible cup body having an annular wall whose inner surface is subject to outward fluid pressure and whose outer surface is adapted to engage the interior of a casing or the like, said wall having an annular cavity located outward of said inner surface, and circumferentially extensible reinforcing means located in the cavity to resist radial outward loads, the reinforcing means comprising a circumferentially extensible resilient split ring, said ring being free to move circumferentially with respect to the side walls of the cavity during circumferential extension.

9. A fluid retaining cup for use in a casing or the like, comprising a flexible cup body having an annular wall whose inner surface is subject to outward fluid pressure and whose outer surface is adapted to engage the interior of the casing or the like, said wall having an annular cavity and having a wall portion disposed inward of said cavity, and circumferentially extensible reinforcing means located in the cavity outward of said wall portion and adapted to engage said wall portion to resist radial outward loads, the reinforcing means being free to move with respect to the side walls of the cavity during circumferential extension.

PAUL H. GRANGER.